US012680153B2

(12) United States Patent
Evans et al.

(10) Patent No.: US 12,680,153 B2
(45) Date of Patent: Jul. 14, 2026

(54) SUPER CQHT HIGH TEMPERATURE ALLOY-RESISTANT ALUMINIZED STEEL WITH MODERATE FORMABILITY

(71) Applicant: Cleveland-Cliffs Steel Properties Inc., West Chester, OH (US)

(72) Inventors: James F. Evans, Middletown, OH (US); Jerry Lee Arnold, Franklin, OH (US)

(73) Assignee: Cleveland-Cliffs Steel Properties Inc.

( * ) Notice: Subject to any disclaimer, the term of this patent is extended or adjusted under 35 U.S.C. 154(b) by 177 days.

(21) Appl. No.: 18/115,889

(22) Filed: Mar. 1, 2023

(65) Prior Publication Data

US 2023/0323522 A1    Oct. 12, 2023

Related U.S. Application Data

(60) Provisional application No. 63/329,514, filed on Apr. 11, 2022.

(51) Int. Cl.
| | |
|---|---|
| *C23C 2/12* | (2006.01) |
| *B32B 15/01* | (2006.01) |
| *C21D 1/26* | (2006.01) |
| *C22C 21/02* | (2006.01) |
| *C22C 38/00* | (2006.01) |
| *C22C 38/04* | (2006.01) |
| *C22C 38/06* | (2006.01) |
| *C23C 2/40* | (2006.01) |

(52) U.S. Cl.
CPC .............. *C23C 2/12* (2013.01); *B32B 15/012* (2013.01); *C21D 1/26* (2013.01); *C22C 21/02* (2013.01); *C22C 38/001* (2013.01); *C22C 38/04* (2013.01); *C22C 38/06* (2013.01); *C23C 2/40* (2013.01)

(58) Field of Classification Search
CPC ......... B32B 15/012; C23C 26/00; C23C 2/12; C23C 2/40; C22C 38/001; C22C 38/06; C22C 21/02
USPC .......................................................... 428/653
See application file for complete search history.

(56) References Cited

U.S. PATENT DOCUMENTS

| | | | |
|---|---|---|---|
| 3,881,880 A | | 5/1975 | Gomersall |
| 4,546,051 A | * | 10/1985 | Uchida ..................... C23C 2/12 |
| | | | 148/531 |
| 5,746,843 A | * | 5/1998 | Miyata .................... C22C 38/24 |
| | | | 148/333 |
| 6,328,824 B1 | | 12/2001 | Mareuse et al. |

(Continued)

FOREIGN PATENT DOCUMENTS

| | | |
|---|---|---|
| JP | S57-26124 | 2/1982 |
| JP | S58224159 A | 12/1983 |

OTHER PUBLICATIONS

International Search Report and Written Opinion dated Apr. 24, 2023 for Application No. PCT/US2023/014245, 12 pages.

*Primary Examiner* — Katherine A Christy
(74) *Attorney, Agent, or Firm* — FBT Gibbons LLP

(57) ABSTRACT

A coated steel sheet includes a steel strip and an aluminum-based coating. In some versions, the steel sheet includes, in percent weight: carbon: less than 0.020%, manganese: less than 0.40%, aluminum: less than 0.015%, nitrogen: less than 0.008%, and the balance including iron and impurities. The steel strip includes a free nitrogen concentration of greater than 40 parts per million (PPM). The aluminum-based coating is disposed on at least one surface of the steel strip.

11 Claims, 8 Drawing Sheets

(56) References Cited

U.S. PATENT DOCUMENTS

| | | | |
|---|---|---|---|
| 7,717,976 B2 | 5/2010 | Coe et al. | |
| 2003/0047257 A1* | 3/2003 | Kami | C21D 8/0273 |
| | | | 148/320 |
| 2017/0051377 A1* | 2/2017 | Saito | C21D 8/02 |
| 2022/0033929 A1* | 2/2022 | Kim | B32B 15/012 |

* cited by examiner

SUPER CQHT HIGH TEMPERATURE ALLOY-RESISTANT ALUMINIZED STEEL WITH MODERATE FORMABILITY

PRIORITY

This application claims priority to U.S. Provisional Application Ser. No. 63/329,514, entitled SUPER CQHT HIGH TEMPERATURE ALLOY-RESISTANT ALUMINIZED STEEL WITH MODERATE FORMABILITY, filed on Apr. 11, 2022, the disclosure of which is incorporated by reference herein.

BACKGROUND

The present invention pertains to aluminized carbon steels. Aluminizing may be performed to a steel to coat one or more surfaces of the steel with an aluminum-based coating. Such aluminum-based coatings may be alloyed with other constituents in some circumstances. For instance, in Type-1 aluminized coatings, aluminum may be alloyed with silicon. Such alloying may be desirable to enhance formability of the coating. In other circumstances, commercially pure aluminum may be used without alloying. Such commercially pure aluminized coatings may be referred to as Type-2 aluminized coatings.

In some circumstances, it may be desirable for aluminized coatings to be resistant to heat for applications in high temperature environments. Type-1 aluminized coatings may be particularly desirable in such circumstances because the silicon present in the coating reduces the alloy layer thickness to make the coating more formable and more resistant to heat.

When an aluminized coating is subjected to high heats, alloying between the aluminized coating and the steel substrate is generally undesirable. In some circumstance, alloying between the aluminized coating and the steel substrate may be avoided by annealing the coated steel after a coating process is complete. Such annealing may promote the diffusion of free nitrogen to the steel-coating interface, which may act as an alloying prophylactic between the steel substrate and the coating.

Annealing of an aluminized steel may be performed using a variety of processes. In one such process, the aluminized steel may be subjected to box annealing. During a box annealing process, the aluminized steel may be subjected to a soaking heat treatment after coiling in a closed container to reduce oxidation. Treatment times during box annealing may be relatively high, while treatment temperatures may be relatively low.

When an aluminized steel coil is subjected to box annealing, defects may result from the process under some circumstances. For instance, in some circumstances, coating pick defects may appear where localized portions the aluminized coating separate from the steel substrate and adhere to an adjacent localized portion of the aluminized coating within the coil. Such coating pick defects may be undesirable because the result may lead to some localized portions of the steel being uncoated and other localized portions of the steel being double coated. Thus, in some circumstances, it may be desirable to either eliminate such coating pick defects or the need to perform box annealing entirely.

DETAILED DESCRIPTION

Figure 1:
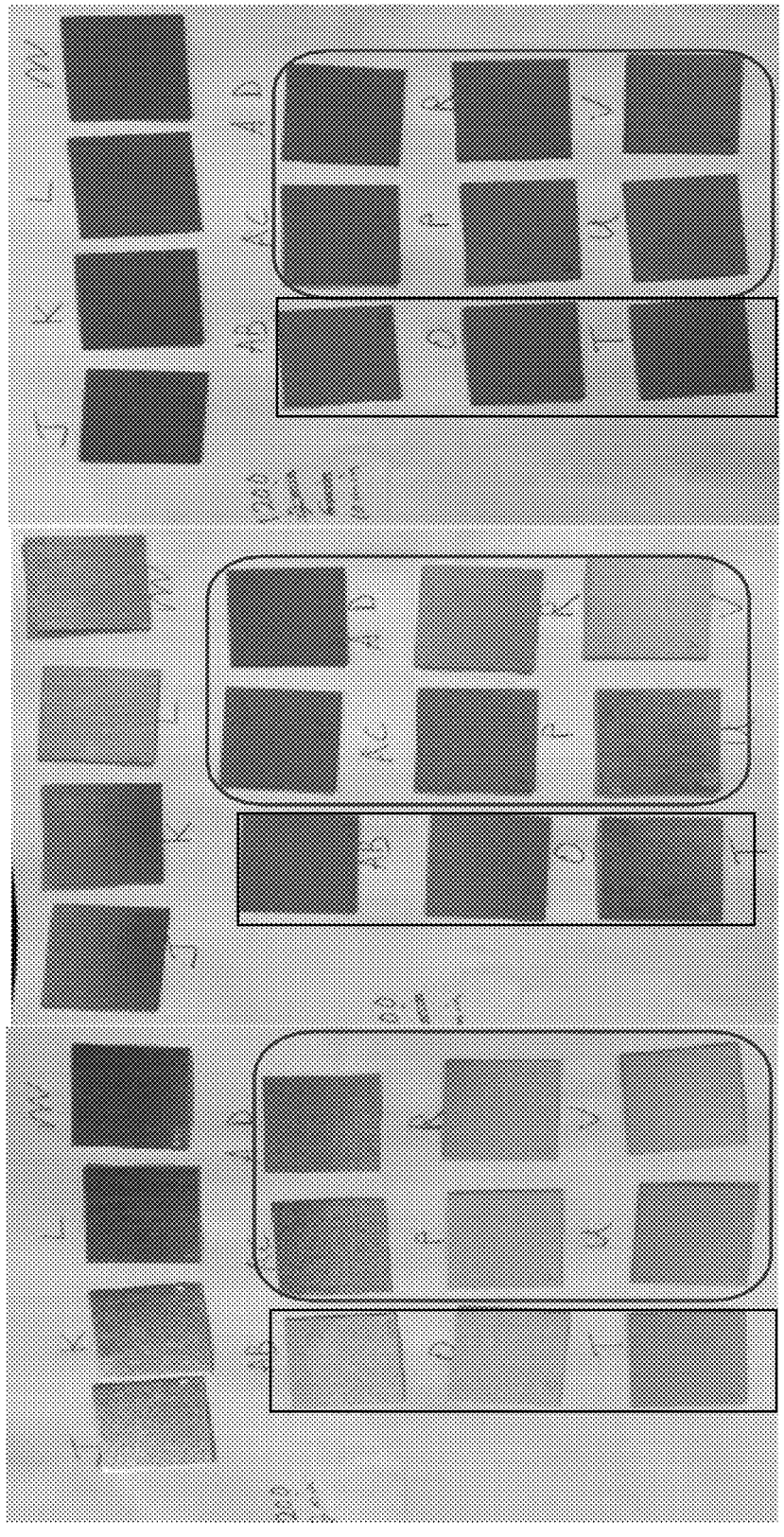
FIG. 1 depicts images of a first series of tests where test coupons were heated to 1200° F. for times of 2 minutes, 5 minutes, and 10 minutes.

The present invention pertains to aluminized steels. Aluminized steels may be desirable to provide corrosion resistance comparable to stainless steel at a lower cost. Additionally, aluminized steels may exhibit the property of heat reflectivity. Thus, aluminized steels may be desirable for in-service environments where corrosion and/or high heat may be present.

Aluminized coatings may be referred to as Type-1 and Type-2 aluminized coatings. In Type-1 aluminized coatings, aluminum may be alloyed with silicon to form an aluminum-silicon-iron alloy on one or more surfaces of the steel. Such aluminum-silicon alloys in Type-1 aluminized coatings may include about 5 to 11% silicon and a balance of aluminum and impurities. The presence of silicon may control the formation of an intermetallic layer between the steel substrate and the coating during a hot-dip coating process. For instance, the presence of silicon may contribute to slowing the growth of the intermetallic layer during the hot-dip coating process. In the as-coated condition, the restricted growth of the intermetallic layer may be desirable to improve formability and heat resistance of the aluminized coating. Type-1 aluminized coatings may therefore be desirable in contexts where heat resistance is desirable.

Type-2 aluminized coatings, by contrast, include commercially pure aluminum without additional alloying elements. Without the presence of additional alloying elements, the formation of the intermetallic layer may be less controlled during the hot-dip coating process relative to Type-1 aluminized coatings. However, without the presence of additional alloying elements, the aluminized coating may be more resistant to corrosion relative to Type-1 aluminized coatings. Type-2 aluminized coatings may therefore be desirable in contexts where corrosion resistance is prioritized over heat resistance. Although aspects of the present disclosure relate primarily to Type-1 aluminized coatings configured for high heat resistance, it should be understood that the principles described herein may nonetheless be applicable to Type-2 aluminized coatings.

It may be desirable to avoid further alloying between a steel substrate and an aluminized coating in environments where high temperatures are encountered (e.g., with Type-2 aluminized coatings). In particular, the elevated environmental temperatures of may create a natural driving force towards alloying between the steel substrate and the aluminized coating. Such alloying may result in diffusion of iron from the steel substrate into the aluminized coating. When alloying does occur, the aluminized coating may fail and/or the surface quality of the aluminized coating may degrade. One sign of alloying can be a decrease in the shine or luster of the aluminized coating (e.g., the surface may become dull), which in itself may be undesirable.

One method to avoid alloying between the steel substrate and the aluminized coating may be to subject the coated steel to an annealing process. By annealing the coated steel, excess free nitrogen in the steel substrate may diffuse or migrate to the interface of the steel substrate and the aluminized coating. When a sufficient concentration of free nitrogen is present at the interface, the concentration of free nitrogen may act as a barrier to alloying.

Although a variety of annealing processes may be used, one suitable process is box annealing. When box annealing is used, a coated steel coil is enclosed within a furnace or oven filled with an inert gas to reduce oxidation. The furnace or oven may then subject the coated steel coil to a soaking heat treatment at a relatively low temperature for a relatively long duration. In such a heat treatment, the time and temperature of heat treatment may be long and hot enough to promote the diffusion of free nitrogen in the steel substrate to the interface between the steel substrate and the aluminized coating. Meanwhile, the temperature may be low enough to reduce undesirable effects such as alloying between the steel substrate and the aluminized coil.

Although box annealing can render the aluminized coating suitable for use in a high temperature environment, certain coating pick defects have been observed in coated steel coils subjected to box annealing. Coating pick defects occur when a localized portion of the aluminized coating separates from the steel substrate within the coated steel coil and adheres to an adjacent aluminized coating in the coated steel coil. As a result, observation of coating pick defects occurs when some localized portions of a coated steel coil are uncoated while other localized portions of the coated steel coil are double coated. In other words, coating pick defects may lead to inconsistencies in the aluminized coating on the steel substrate. Coating pick defects are accordingly undesirable and it may therefore be desirable to eliminate coating pick defects by reducing or otherwise eliminating the need to perform box annealing.

An example of a commercial product prepared in accordance with the above-referenced box annealing process is referred to as drawing quality high temperature steel (DQHT steel). DQHT steel may have relatively low free nitrogen of about 20 to 40 ppm. The presence of relatively low free nitrogen may contribute to the steel having relatively high formability performance. Such formability may be desirable in applications where drawing of the steel is performed. However, due to the relatively low free nitrogen concentration of such steel, box annealing may be used to promote diffusion of the free nitrogen within the steel to the interface between the steel substrate and the aluminized coating.

In some applications, this may be desirable to have a product with both high temperature alloying resistance and high formability. However, due to the possibility of pick defects resulting from box annealing, each coil may be subjected to enhanced inspection for pick defects. Such inspection may result in increased material costs either due to the enhanced inspection itself or additional scrap resulting from inspection.

In one aspect of the present invention, high temperature aluminized coating performance can be improved by increasing the concentration of free nitrogen in a steel substrate. When a sufficient concentration of free nitrogen is present in the steel substrate, sufficient diffusion of the free nitrogen to the interface between the steel substrate and the aluminized coating can occur with only heat encountered during the aluminizing process. Additional annealing processes such as box annealing may therefore be eliminated when the steel substrate includes sufficient free nitrogen.

One suitable concentration for free nitrogen in the steel substrate may be 40 parts per million (ppm) or more. Another suitable concentration for free nitrogen in the steel substrate may be 90 ppm or more. When free nitrogen is at or above 90 ppm, the concentration of free nitrogen may be high enough to promote relatively high susceptibility to diffusion of the free nitrogen. In particular, diffusion of free nitrogen may occur in the relatively limited time and temperature encountered by the steel substrate while being submerged in the hot-dip bath and subsequent strip cooling associated with aluminizing. Such diffusion during aluminizing may be sufficient to reduce the alloying propensity of the aluminized coating enough to eliminate the need for annealing of the coated steel entirely. As a result, the coated steel may be capable of withstanding temperatures of about 1050° F. for about 200 hours without substantial alloying between the steel substrate and the aluminized coating. Moreover, the coated steel may be cable of withstanding burst temperatures of about 1100° F. for about 60 minutes or less without substantial alloying between the steel substrate and the aluminized coating.

One suitable composition for the steel substrate may include <0.020% carbon; <0.40% manganese (12×% sulfur); <0.015% aluminum; >0.008% nitrogen, with free nitrogen ($N_s$)>90 ppm; and the balance being iron and impurities. In the above-reference composition, the concentration of sulfur is expressed as a ratio to the manganese concentration. In other words, the ratio of manganese to sulfur in the above-referenced composition is 12 or more. In some versions, the maximum concentration of sulfur is set at 0.015% regardless of manganese concentration.

When free nitrogen is 90 ppm or more, the steel substrate may exhibit increased mechanical properties and/or lower elongation. Thus, aspects of the present disclosure may be most suitable for commercial applications where material specifications do not place minimums on mechanical properties and/or designate minimum elongations. Such products may accordingly be referred to as commercial quality high temperature steels (CQHT) or super CQHT steels.

Example 1

Testing was performed to evaluate the role of free nitrogen in reducing alloying. In a first series of tests, alloying was measured by visually observing the appearance of a metallic coating on a steel coupon after exposure of the steel coupon to a predetermined temperature for a predetermined period of time.

The testing apparatus included a soaking furnace equipped with type K-thermocouples (K-tc) welded to non-test coupons positioned on opposite ends of a sample rack. The particular soaking furnace used was selected for its thermal uniformity and accessories. Test coupons were positioned in the sample rack between the thermocouples. The thermocouples were in communication with a data logger for use in collecting time and temperatures.

The sample rack with test coupons was loaded into the soaking furnace for testing at a relatively deep position within the soaking furnace. Testing included temperatures ranging from 1050 F to 1200 F, with each temperature including testing for different times. The times and temperatures used for testing are reproduced below in Table 1.

TABLE 1

| Testing Parameters (Temperature and Time) | | | | |
| --- | --- | --- | --- | --- |
| Temperature | Time-1 | Time-2 | Time-3 | Time-4 |
| 1200° F. | 2 min | 5 min | 10 min | |
| 1150° F. | 6 min | 15 min | | |
| 1100° F. | 15 min | 30 min | 1 hr | 51 hr |
| 1050° F. | 50 hr | 150 hr | 280 hr | |

Each test coupon including varying free nitrogen within the steel substrate of each test coupon. A summary of the test coupons subjected to testing is shown below in Table 2.

TABLE 2

| Test Coupon Data | | | | | |
| --- | --- | --- | --- | --- | --- |
| Sample ID | Coil | Heat No. | Slab No. | Ns (ppm) | Al (ppm) |
| J, K | 739921-1a | 892490 | 43 | 56 | 50 |
| L, M | 739921-1b | 892488 | 41 | 94 | 6 |
| O, P, R | 740587-2a | 892488 | 59 | 41 | 21 |
| AB, AC, AD | 739922-1a | 892489 | 43 | 47 | 62 |
| T, U, V | 748528-2b | 793454 | 43 | 104 | 19 |

After the test coupons were subjected to the thermal cycles identified in Table 1, the coating of each test coupon was imaged. Performance was evaluated on the basis of coating appearance. For instance, a coating appearance having a relatively high shine and/or luster corresponded to relatively low alloying, while a coating appearance having a relatively dull appearance corresponded to relatively high alloying.

Among the test coupons, results were divided by certain pre-testing test coupon characteristics. Specifically, test coupons were divided into three groups. In a first group, test coupons were subjected to normal box/temper (BAT) prior to being subjected to the thermal cycles identified in Table 1. In a second group, test coupons were coated and tempered (AL-T). Finally, in a third group, test coupons were in an as-coated condition prior to being subjected to the thermal cycles identified in Table 1.

FIG. 1 shows the results of testing at a temperature of 1200° F. at various times. Test coupons on the left side of the page correspond to 2 minutes, while test coupons on the right side of the page correspond to 10 minutes. Test coupons in the middle of the page correspond to 5 minutes. Test coupons of the first group (BAT) are identified by a rounded rectangle. Test coupons of the second group (AL-T) are identified by a squared rectangle. Test coupons of the third group (as-coated) are arranged in the top row of each image.

As can be seen, the coating appearance for all test coupons remained relatively high in luster after 2 minutes of being subjected to a temperature of 1200° F. After 5 minutes, some test coupons exhibited a relatively dull coating appearance, while other test coupons maintained a relatively high luster. Specifically, within the first group (BAT), test coupons AC, AD, and P began to exhibit a relatively dull coating appearance, while test coupons R, U, and V maintained a relatively high luster. Within the second group (AL-T), test coupons AB, and O began to exhibit a relatively dull coating appearance, while test coupon T maintained a relatively high luster. Within the third group (as-coated), test coupons J and K began to exhibit some dulling of their respective coating appearances, while test coupons L and M maintained at least some luster in their respective coating appearance.

Figure 2:
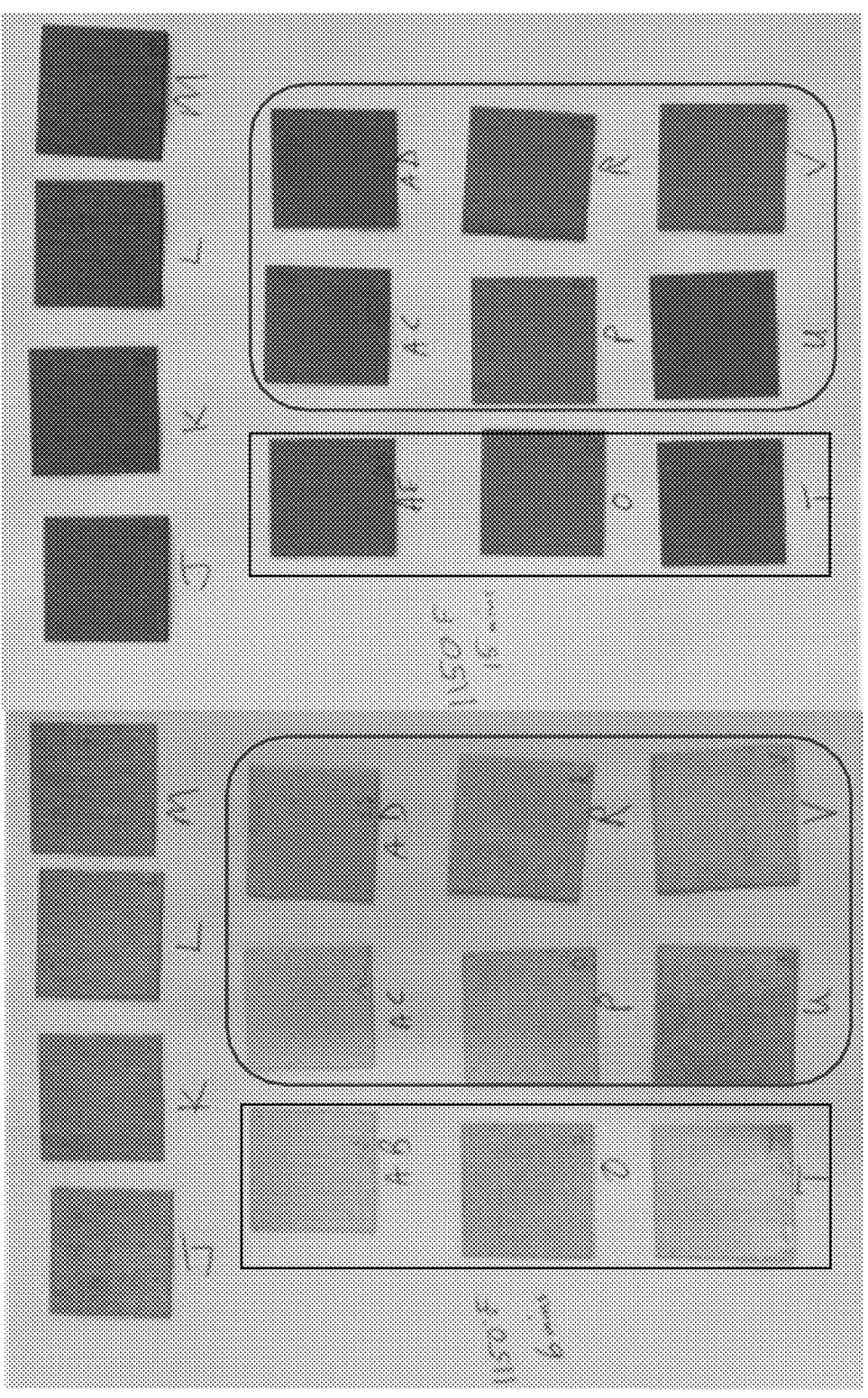
FIG. 2 depicts images of a second series of tests where test coupons where heated to 1150° F. for times of 6 minutes and 15 minutes.

FIG. 2 shows the results of testing at a temperature of 1150° F. at various times. Test coupons on the left side of the page correspond to 6 minutes, while test coupons on the right side of the page correspond to 15 minutes. Test coupons of the first group (BAT) are identified by a rounded rectangle. Test coupons of the second group (AL-T) are identified by a squared rectangle. Test coupons of the third group (as-coated) are arranged in the top row of each image.

As can be seen, the coating appearance for all test coupons remained relatively high in luster after 6 minutes of being subjected to a temperature of 1150° F. By contrast, after 15 minutes, all test coupons exhibited dulling of their respective coating appearances.

Figure 3:
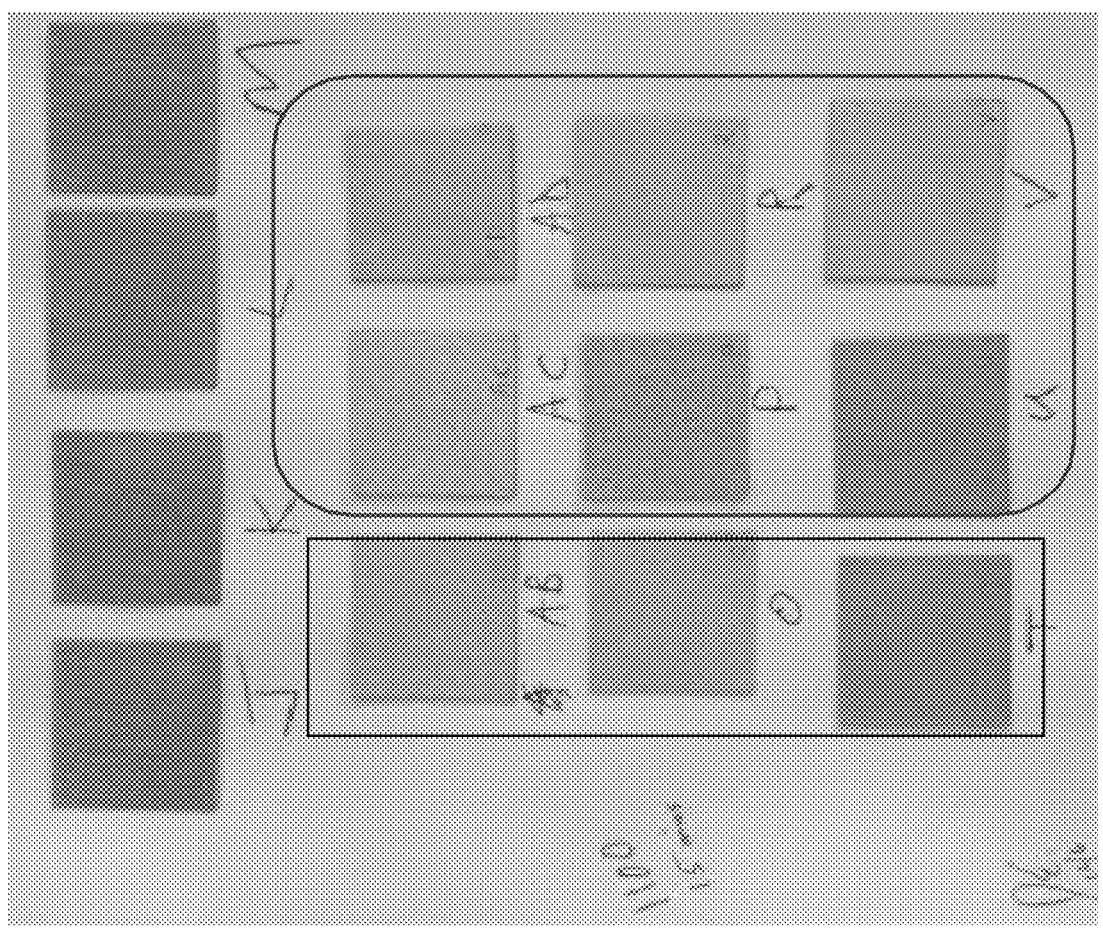
FIG. 3 depicts images of a third series of tests where test coupons were heated to 1100° F. for a time of 15 minutes.
Figure 4:
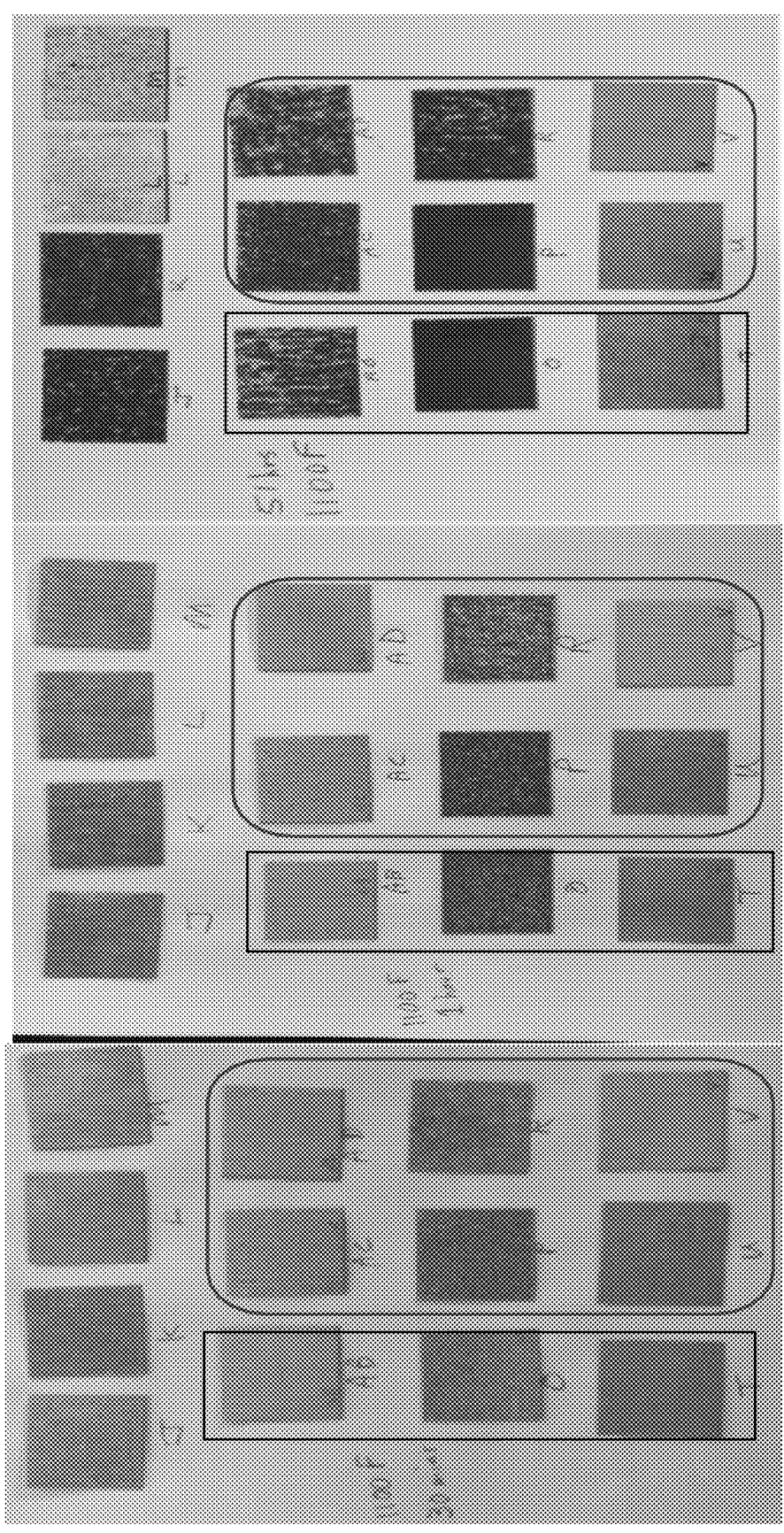
FIG. 4 depicts images of the third series of tests where test coupons were heated to 1100° F. for times of 30 minutes, 1 hour, and 51 hours.

FIGS. 3 and 4 show the results of testing at a temperature of 1100° F. at various times. Test coupons shown in FIG. 3 correspond to testing at 15 minutes. Meanwhile, in FIG. 4, test coupons on the left side of the page correspond to 30 minutes, while test coupons on the right side of the page correspond to 51 hours. Test coupons in the middle of the page of FIG. 4 correspond to 1 hour. Test coupons of the first group (BAT) are identified by a rounded rectangle. Test coupons of the second group (AL-T) are identified by a squared rectangle. Test coupons of the third group (as-coated) are arranged in the top row of each image.

As can be seen, the coating appearance for all test coupons remained relatively high in luster after 15 minutes (see FIG. 3). Similar results were observed after 30 minutes (see FIG. 4), with some increasing dullness in the coating appearance for test coupons O, P, and R. After 1 hour, further increasing dullness in the coating appearance for test coupons O, P, and R was observed, while all other test coupons remained relatively high in luster.

After 51 hours, variation in the coating appearance between different test coupons was observed. For instance, within the first group (BAT), test coupons AC, AD, P, and R exhibited a relatively dull coating appearance, while test coupons U, and V maintained a relatively high luster. Within the second group (AL-T), test coupons AB, and O exhibited a relatively dull coating appearance, while test coupon T maintained a relatively high luster. Within the third group (as-coated), test coupons J and K exhibited a relatively dull coating appearance, while test coupons L and M maintained a relatively high luster.

Figure 5:
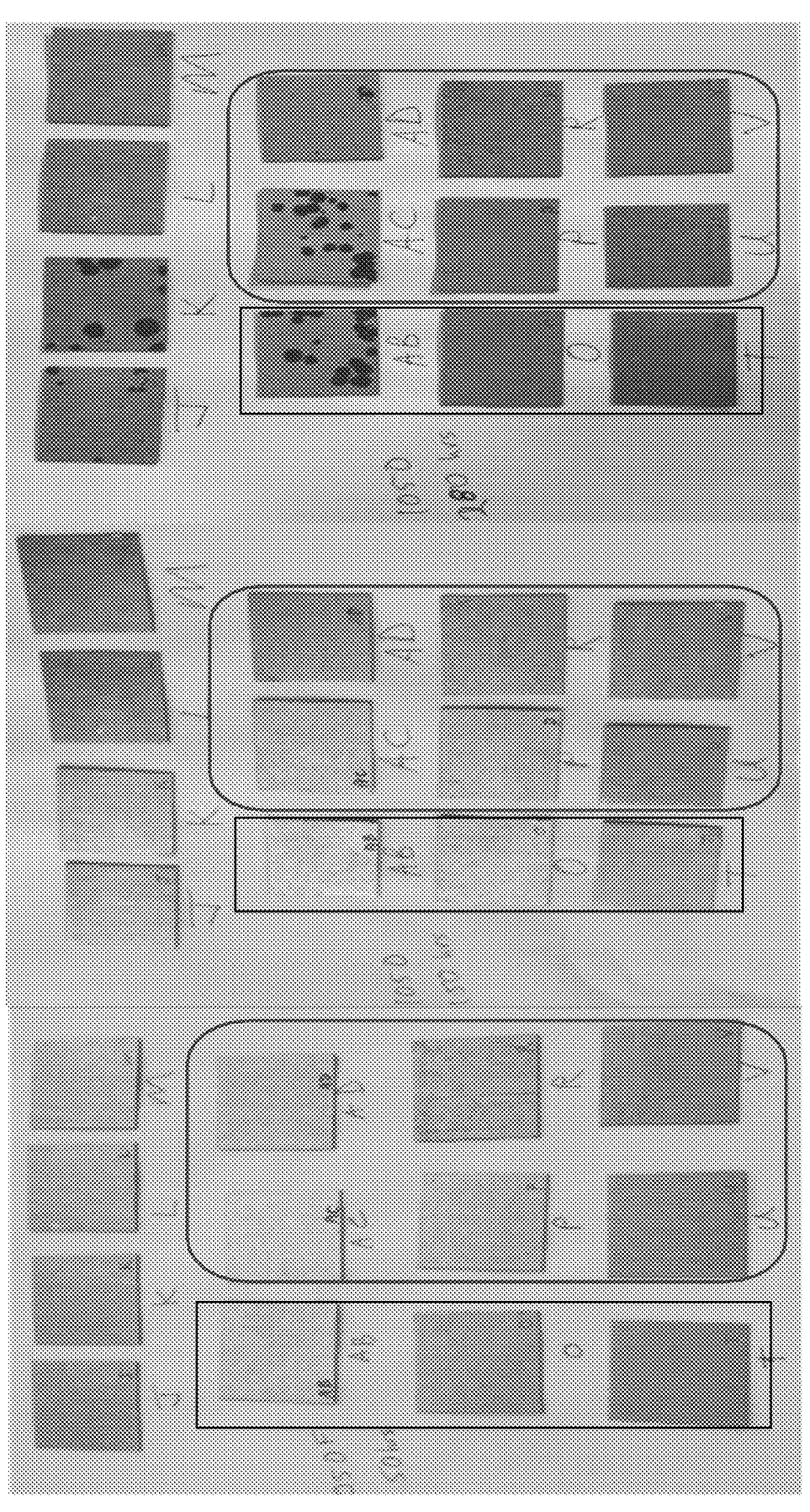
FIG. 5 depicts images of a fourth series of tests where test coupons were heated to 1050° F. for times of 50 hours, 150 hours, and 280 hours.

FIG. 5 shows the results of testing at a temperature of 1050 F at various times. Test coupons on the left side of the page correspond to 50 hours, while test coupons on the right side of the page correspond to 280 hours. Test coupons in the middle of the page correspond to 150 hours. Test coupons of the first group (BAT) are identified by a rounded rectangle. Test coupons of the second group (AL-T) are identified by a squared rectangle. Test coupons of the third group (as-coated) are arranged in the top row of each image.

As can be seen, the coating appearance for all test coupons remained relatively high in luster after 50 hours of being subjected to a temperature of 1050° F. After 150 hours, all test coupons remained relatively high in luster. After 280 hours, many test coupons exhibited signs of a dulling coating appearance. Specifically, within the first group (BAT), all test coupons exhibited some dulling of the coating appearance. Additionally, test coupon AC exhibited some localized areas of relatively high dulling of the coating appearance. Within the second group (AL-T), all test coupons also exhibited some dulling of the coating appearance. Additionally, test coupon AB exhibited some localized areas of relatively high dulling of the coating appearance. Within the third group (as-coated), test coupons J and K began to exhibit some dulling of their respective coating appearances. This dulling was relatively high in some localized areas and relatively low in other localized areas. Meanwhile, test coupons L and M maintained at least some luster in their respective coating appearance, while also showing some signs of dulling in comparison to treatment times of 50 and 150 hours.

Example 2

After testing described above in Example 1 was performed, efforts were made to develop more quantitative metrics on alloying resistance. In particular, test coupons were subjected to X-ray fluorescence (XRF) to quantify the aluminum-iron ratio present in the coating of certain test coupons. Scatter plots were then prepared of the XRF test results. The particular XRF program used was a proprietary program developed to generate data based on fluoresced X-ray peaks for the particular element(s) of interest. In this program, background X-ray counts were subtracted to report the X-ray counts for the specific element(s) of interest in counts per second. The results were compared to a reference (e.g., as-received samples). Because the particular program used was comparative in nature, it should be understood that in other examples, other XRF programs may be used where test XRF data is compared to a reference.

XRF testing was performed on several groups of test coupons. In particular, in a first XRF test, raw test coupons were tested to establish a baseline aluminum-iron ratio. "Raw" used in this context refers to test coupons subjected to no additional thermal cycles such as the 1200, 1150, 1100, and 1050° F. thermal cycles described above in Example 1.

Further XRF testing was performed on test coupons of the first group and the second group referred to above in Example 1. As discussed above, test coupons of the first group (BAT) were identified by a rounded rectangle and test coupons of the second group (AL-T) were identified by a squared rectangle. The results of the XRF testing performed are shown below in Table 3.

8

In Table 3 shown above, the data in the column labeled "As Rec'd" corresponds to the comparative value before additional processing was performed. In other words, the "As Rec'd" column provides a baseline value for each sample tested. Meanwhile, the three subsequent columns (from left to right) correspond to data recorded after a particular form of processing was performed. In Table 3, the particular processing performed was 1050° F. for 100 hours, 1100° F. for 0.5 hours, and 1100 F.° for 1 hour, respectively. Each number in the first four columns described above is expressed as a ratio of the XRF counts detected for aluminum divided by XRF counts detected for iron. Although the data shown in Table 3 may imply that different discrete samples were subjected to particular processing parameters, it should be understood that in some examples, XRF testing may be used to test a single sample using multiple parameters. For instance, in some examples a given sample may first be subjected to a particular time and temperature, removed from the furnace and then subjected to XRF testing. The same sample may then be placed back into the furnace and subjected to another particular time and temperature, removed from the furnace and then subjected to XRF testing again. Such a method of testing may be beneficial in some examples to detect substrate alloying over time.

The three subsequent columns on the right of Table 3 express each test result as a percentage of the "As Rec'd" or baseline value. For instance, in the first row of Table 3, the baseline value was 3.19. Meanwhile, the value record after subjecting the sample to 1050° F. for 100 hours was 3.20. This value expressed as a percentage of the baseline value is thus about 100%. In other words, about zero change in the aluminum to iron ratio was observed, indicating about zero alloying for that particular sample processed at 1050° F. for 100 hours.

During alloying, aluminum may diffuse into the iron in the steel substrate, while iron may diffuse into the aluminum coating. Thus, a decrease in an aluminum-to-iron ratio in Table 3 corresponds to an observation of alloying. In per-

TABLE 3

| | | | | | Results: XRF Testing | | | |
|---|---|---|---|---|---|---|---|---|
| S/C No. | Al/Fe As Rec'd | Al/Fe 1050 F./ 100 hr | Al/Fe 1100 F./ 0.5 hr | Al/Fe 1100 F./ 1 hr | Al/Fe 1050 F./ 100 hr Percentage | Al/Fe 1100 F./ 0.5 hr vs to As | Al/Fe 1100 F./ 1 hr Received | |
| 733924-1B | 3.19 | 3.2 | 2.45 | 2.85 | 100% | 77% | 89% | |
| 733924-1B | 2.73 | 2.76 | 2.62 | 2.81 | 101% | 96% | 103% | |
| 733924-1B | 3.19 | 3.33 | 2.84 | 2.43 | 104% | 89% | 76% | |
| 733924-1B | 3.05 | 3.06 | 2.82 | 2.64 | 100% | 93% | 87% | |
| | | | | | 101% | 89% | 89% | Inv. |
| 733924-1B | 3.25 | 3.21 | 2.17 | 2.7 | 99% | 67% | 83% | |
| 733924-1B | 2.95 | 3.05 | 2.49 | 2.76 | 103% | 84% | 94% | |
| 733924-1B | 2.95 | 3.01 | 2.73 | 2.52 | 102% | 92% | 85% | |
| 733924-1B | 3.13 | 3.29 | 2.73 | 2.43 | 105% | 87% | 78% | |
| | | | | | 102% | 83% | 85% | Comp. |
| 733924-2 | 3.35 | 3.38 | 2.51 | 2.28 | 101% | 75% | 68% | |
| 733924-2 | 2.91 | 3.04 | 2.72 | 2.72 | 105% | 94% | 93% | |
| 733924-2 | 3.44 | 3.4 | 2.33 | 2.57 | 99% | 68% | 75% | |
| 733924-2 | 3.17 | 3.21 | 2.5 | 2.72 | 101% | 79% | 86% | |
| | | | | | 101% | 79% | 81% | Inv. |
| 733924-2 | 3.28 | 3.24 | 2.37 | 2.18 | 99% | 72% | 66% | |
| 733924-2 | 3.05 | 3.13 | 2.45 | 2.35 | 103% | 80% | 77% | |
| 733924-2 | 3.46 | 3.36 | 2.52 | 2.64 | 97% | 73% | 76% | |
| 733924-2 | 2.96 | 3.07 | 2.62 | 2.66 | 104% | 89% | 90% | |
| | | | | | 101% | 79% | 77% | Comp. | centage form, a result of about 100% or more may indicate good alloying resistance. Meanwhile, a result of less than 100% may indicate at least some alloying. While it may be desirable to maintain the percentage near 100%, in some versions, some limited alloying may be tolerated. For instance, a percentage of 90 to 95% may still indicate acceptable substrate alloying performance. On the other hand, a percentage of 60 to 70% may indicate extensive alloying, which may be undesirable in some versions.

Once XRF testing was completed, the results were plotted as a function of time and temperature. In these plots, the detected aluminum-iron ratio was used to identify test coupons that exhibited unacceptable alloying versus test coupons that exhibited acceptable alloying. A curve of best fit was then prepared using the results to identify times and temperatures where alloying occurred versus times and temperatures where alloying did not occur.

Figure 6:
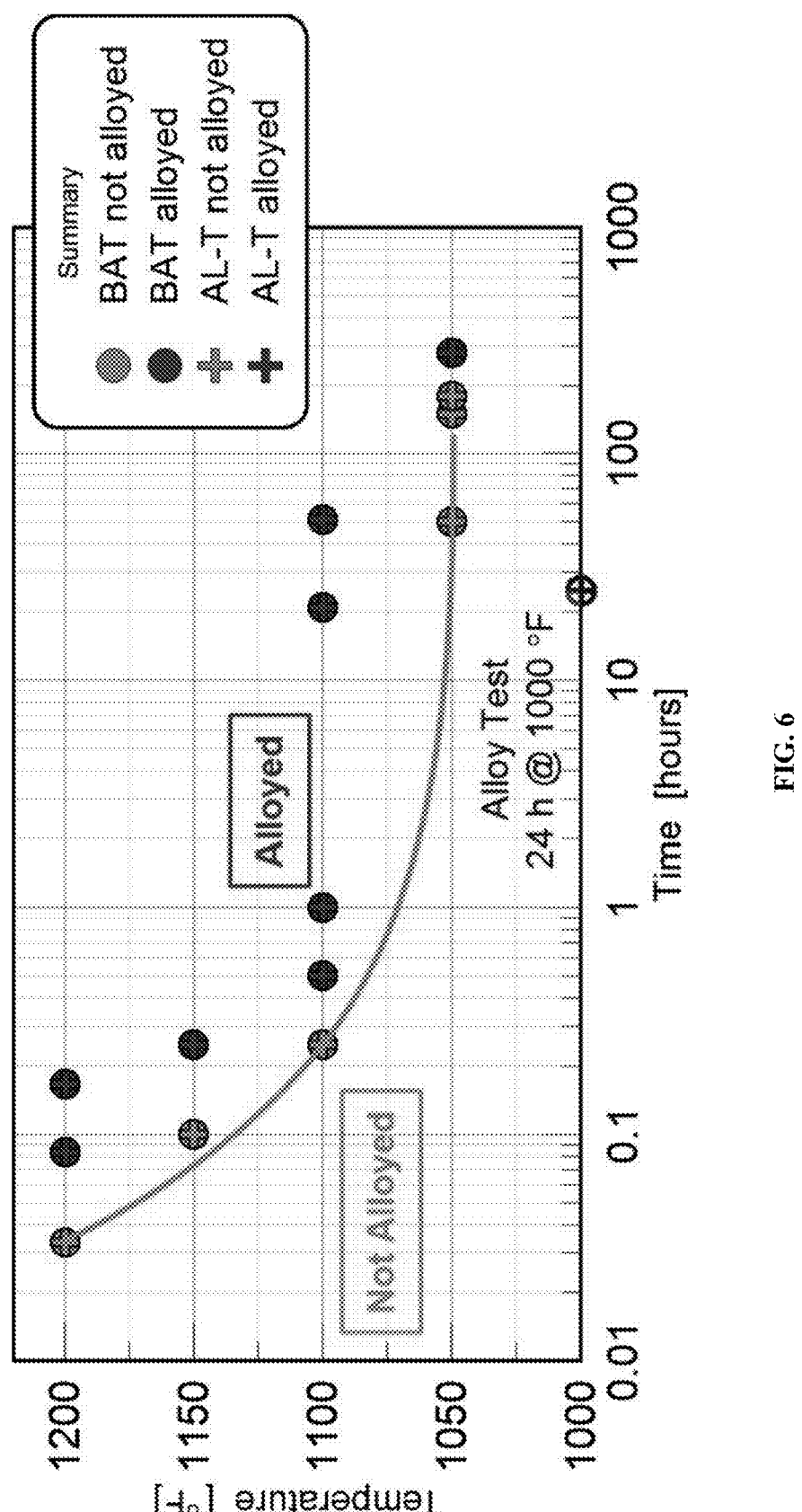
FIG. 6 depicts a plot of Newscale X-ray fluorescence (XRF) data produced based on the tests of FIGS. 1 through 5.

FIG. 6 shows all results of the XRF testing in a scatter plot of time and temperature. Results corresponding to the first group (BAT) are shown symbolically with a circle. Results corresponding to the second group (AL-T) are shown symbolically with a cross. For all results, a color code is used to represent alloyed versus non-alloyed results. In particular, the color red identifies results where unacceptable alloying was identified. Meanwhile, the color green identifies results where acceptable alloying was identified (e.g., not alloyed).

Figure 7:
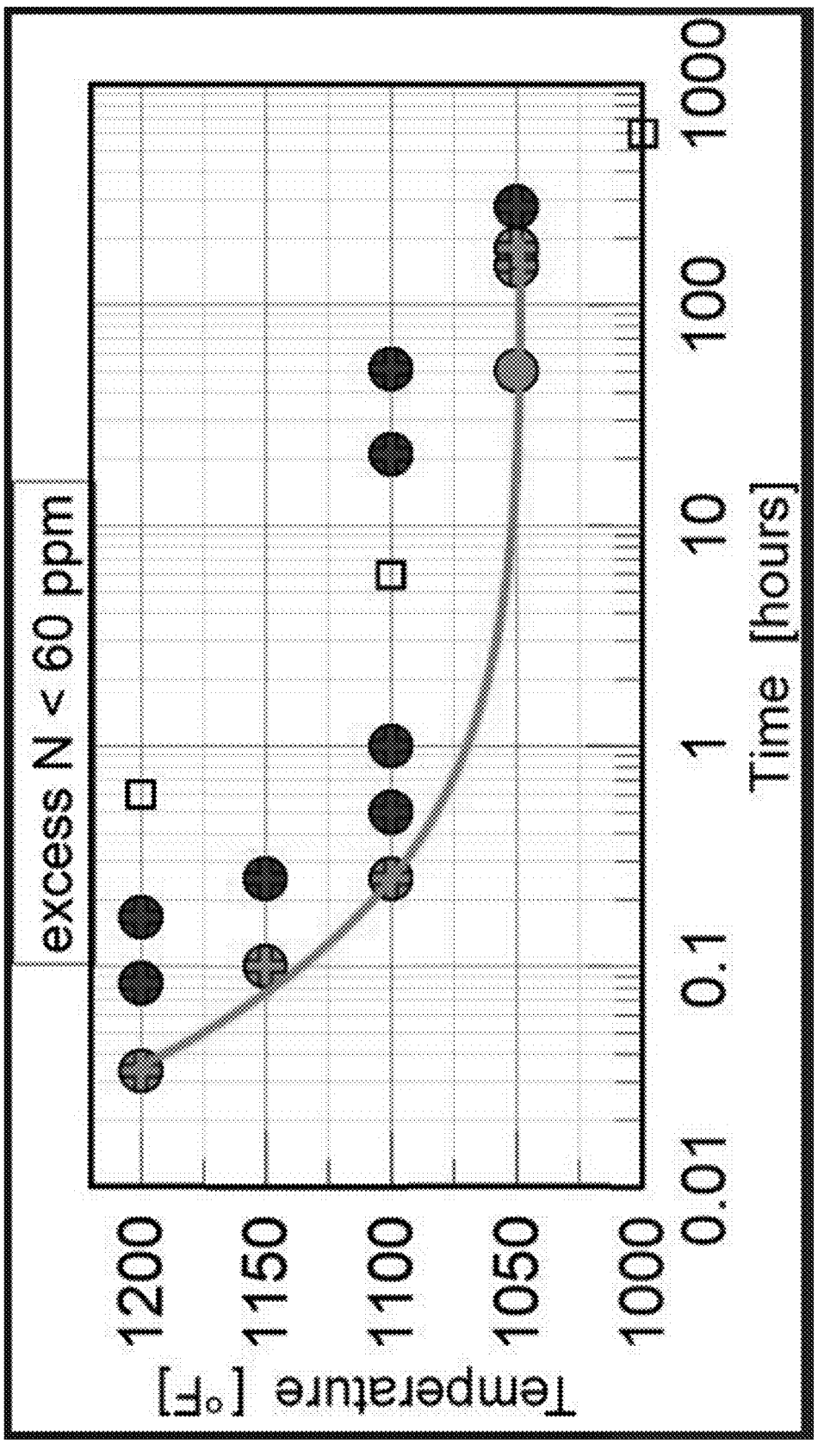
FIG. 7 depicts a plot of the XRF data of FIG. 6, with the data shown for test coupons having an excess free nitrogen of less than 60 parts per million (PPM).
Figure 8:
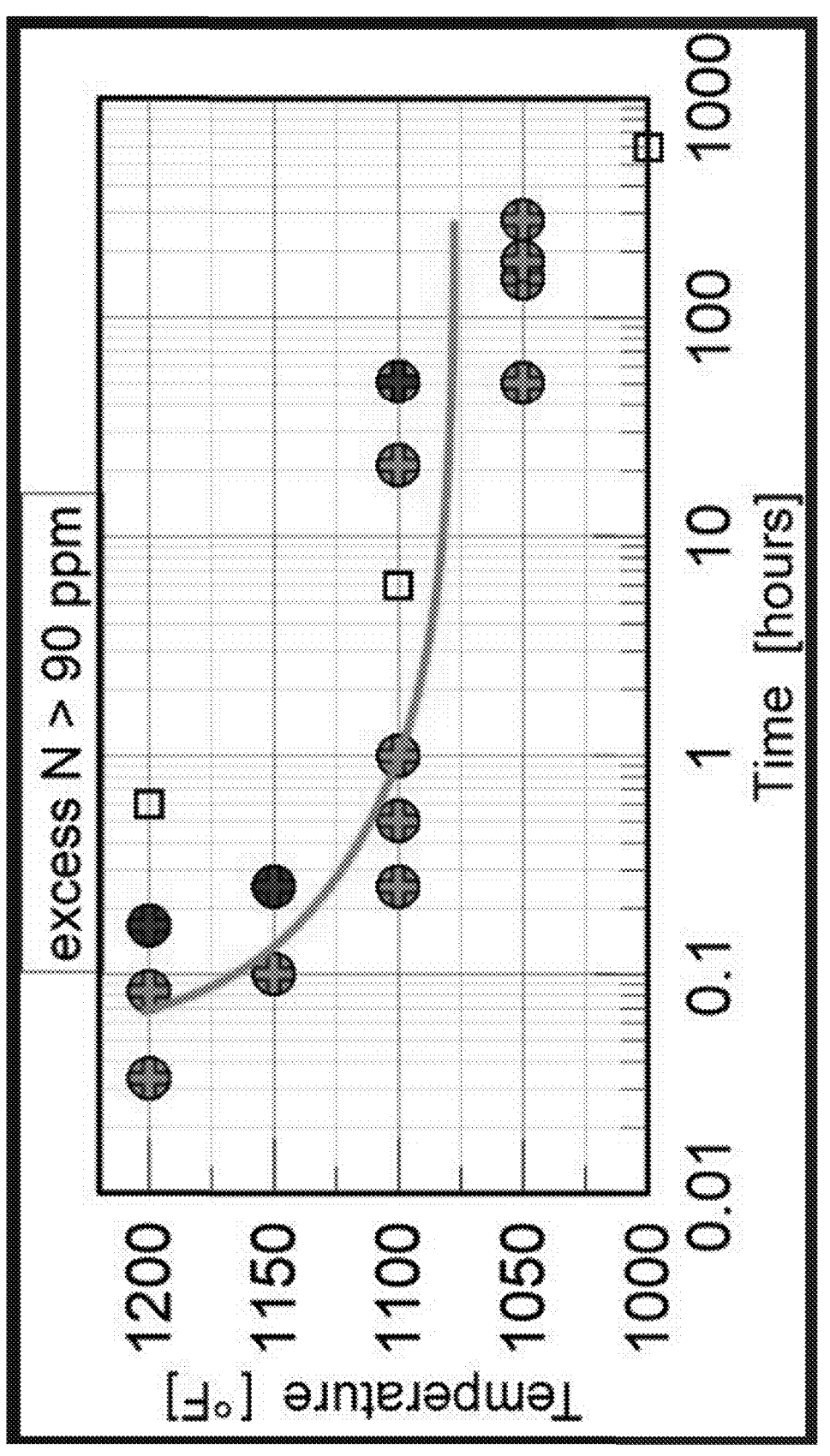
FIG. 8 depicts a plot of the XRF data of FIG. 6, with the data shown for test coupons having an excess free nitrogen of greater than 90 PPM.

FIGS. 7 and 8 show the results of FIG. 6 divided into two separate scatter plots. In particular, the results for test coupons having free nitrogen less than 60 ppm were shown in one scatter plot (see FIG. 7), while the results for test coupons having free nitrogen greater than 90 ppm were shown in another scatter plot (see FIG. 8). By dividing the results on the basis of free nitrogen, the impact of free nitrogen on alloying was more readily identifiable. As can be seen by comparing FIG. 7 to FIG. 8, the boundary curve for acceptable alloying versus unacceptable alloying was driven upwardly and outwardly in terms of temperature and time when free nitrogen was elevated. Thus, FIG. 8 shows superior performance in terms of depressing or preventing alloying when free nitrogen is elevated.

Based on the testing described above, resistance to alloying of an aluminized coating can be a function of chemistry. Specifically, excess free nitrogen can contribute to higher alloying resistance in an aluminized coating. Thus, box annealing may be eliminated as a processing step for aluminized steel strip when free nitrogen in the steel substrate is over 40 ppm. A more robust aluminized coating may be achieved when the steel substrate of an aluminized steel strip is greater than 90 ppm.

Example 3

A coated steel comprises: a steel strip, the steel strip having a free nitrogen concentration of greater than 40 ppm, and an aluminum-based coating, the aluminum-based coating being disposed on at least one surface of the steel strip.

Example 4

The coated steel of Example 3, wherein the steel strip further includes, in percent weight: carbon: less than 0.020%; manganese: less than 0.40%; aluminum: less than 0.015%; nitrogen: less than 0.008%; and the balance including iron and impurities.

Example 5

The coated steel of Examples 3 or 4, the aluminum-based coating being a Type-1 aluminized coating.

Example 6

The coated steel of Examples 3 or 4, the aluminum-based coating being a Type-2 aluminized coating.

Example 7

The coated steel of any one or more Examples 3 through 5, the aluminum-based coating including silicon.

Example 8

The coated steel of any one or more of Examples 3 through 5, the aluminum-based coating including 5 to 11% silicon.

Example 9

The coated steel of any one or more of Examples 3 through 8, the aluminum-based coating being configured to resist alloying with the steel strip subjected to a temperature of 1050° F. for at least 200 hours.

Example 10

The coated steel of any one or more of Examples 3 through 8, the aluminum-based coating being configured to resist alloying with the steel strip subjected to a temperature of 1100° F. for 60 minutes or less.

Example 11

The coated steel of any one or more of Examples 3 through 10, the free nitrogen concentration of the steel strip being greater than 90 ppm.

Example 12

A coated steel was prepared according to the following process:
  (a) preparing a steel strip with a free nitrogen concentration of 40 ppm or more;
  (b) coating the steel strip with an aluminum-based coating; and
  (c) after the step of coating, coiling the coated steel strip without subjecting the coated steel strip to annealing.

Example 13

A coated steel was prepared in accordance with the process of Example 12, wherein the step of coating the steel strip includes coating the steel strip with a Type-1 aluminized coating.

Example 14

A coated steel was prepared in accordance with the process of Example 12, wherein the step of coating the steel strip includes coating the steel strip with a Type-2 aluminized coating.

Example 15

A coated steel was prepared in accordance with the process of any one or more of Examples 12 through 14, further comprising the step of subjecting the coated steel strip to a high temperature service environment.

Example 16

A coated steel was prepared in accordance with the process of Example 15, wherein the step of subjecting the coated steel to the high temperature service environment is performed prior to the coated steel strip being subjected to a box annealing process.

Example 17

A coated steel was prepared in accordance with the process of Examples 15 or 16, wherein the high temperature service environment includes subjecting the coated steel strip to a temperature of about 1050° F. for a time of 200 or more hours.

Example 18

A coated steel was prepared in accordance with the process of Examples 15 or 16, wherein the high temperature service environment includes subjecting the coated steel strip to a temperature of 1100° F. or more for 60 minutes or less.

Example 19

A coated steel was prepared in accordance with the process of any one or more of Examples 15 through 18, wherein the coated steel strip is configured to resist substantial alloying between the aluminum-based coating and the steel strip during the step of subjecting the coated steel to the high temperature service environment.

Example 20

A coated steel comprises: a steel strip including, in percent weight:
    carbon: less than 0.020%;
    manganese: less than 0.40%;
    aluminum: less than 0.015%;
    nitrogen: greater than 0.008%; and
    the balance including iron and impurities, and
    wherein the steel strip having a free nitrogen concentration of greater than 90 ppm.

Example 21

The coated steel of Example 20, further comprising an aluminized coating disposed on at least one surface of the steel strip.

Example 22

The coated steel of Example 21, wherein the aluminized coating is a Type-1 or Type 2 aluminized coating.

What is claimed is:

1. A coated steel sheet, comprising:
   (a) a steel strip, the steel strip including a free nitrogen concentration of greater than 40 ppm, wherein the steel strip further includes, in percent weight:
       carbon: less than 0.020%,
       manganese: less than 0.40%,
       aluminum: less than 0.015%,
       nitrogen: greater than 0.008%, and
       the balance including iron and impurities; and
   (b) an aluminum-based coating, the aluminum-based coating being disposed on at least one surface of the steel strip,
   wherein the steel strip defines a prophylactic layer at the interface between the steel strip and the aluminum-based coating, wherein the prophylactic layer includes a concentrated portion of the free nitrogen diffused from a portion of the steel strip using heat applied to the steel strip during application of the aluminum-based coating to the at least one surface of the steel strip.

2. The coated steel of claim 1, the aluminum-based coating being a Type-1 aluminized coating.

3. The coated steel of claim 1, the aluminum-based coating being a Type-2 aluminized coating.

4. The coated steel of claim 1, the aluminum-based coating including silicon.

5. The coated steel of claim 1, the aluminum-based coating including 5 to 11% silicon by percent weight.

6. The coated steel of claim 1, the steel strip being configured to maintain an aluminum-to-iron ratio of 90% or more in the aluminum-based coating after formation of the prophylactic layer when the steel strip subjected to a temperature of 1050° F. for at least 100 hours while in the as-coated condition.

7. The coated steel of claim 1, the steel strip being configured to maintain an aluminum-to-iron ratio of 90% or more in the aluminum-based coating using the prophylactic layer when the steel strip is subjected to a temperature of 1100° F. for 60 minutes or less while in the as-coated condition.

8. The coated steel of claim 1, the free nitrogen concentration of the steel strip being greater than 90 ppm.

9. A coated steel, comprising: a steel strip including, in percent weight:
    carbon: less than 0.020%;
    manganese: less than 0.40%;
    aluminum: less than 0.015%;
    nitrogen: greater than 0.008%; and
    the balance including iron and impurities, and
    wherein the steel strip includes a free nitrogen concentration of greater than 90 ppm,
    wherein the steel strip defines a prophylactic layer adjacent to one or more surfaces of the steel strip, the prophylactic layer including a concentration of diffused free nitrogen, the diffused free nitrogen being diffused into the prophylactic layer in-line with a coating process without being subjected to a box annealing process.

10. The coated steel of claim 9, further comprising an aluminized coating disposed on at least one surface of the steel strip.

11. The coated steel of claim 10, wherein the aluminized coating is a Type-1 or Type-2 aluminized coating.

* * * * *